United States Patent [19]

Reifinger et al.

[11] 4,354,584
[45] Oct. 19, 1982

[54] TRANSMISSION-CLUTCH OPERATING SYSTEM

[75] Inventors: Günther Reifinger, Germering; Christian Fuchs, Oberschliessheim; Alfred Magg, Friedrichshafen; Gerold Bieber, Langenargen, all of Fed. Rep. of Germany

[73] Assignees: Zahnradfabrik Friedrichshafen A.G., Friedrichshafen; Knorr-Bremse GmbH, Munich, both of Fed. Rep. of Germany; a part interest to each

[21] Appl. No.: 80,508

[22] Filed: Oct. 30, 1979

[30] Foreign Application Priority Data

Sep. 30, 1978 [DE] Fed. Rep. of Germany ....... 2842736

[51] Int. Cl.³ .................... F16D 25/00; F16D 13/75
[52] U.S. Cl. ............................. 192/3.57; 137/596.18; 192/111 A; 192/109 D
[58] Field of Search ................ 192/3.57, 3.63, 111 A, 192/99 S, 0.052; 137/596.18; 251/62

[56] References Cited

U.S. PATENT DOCUMENTS

| 2,219,323 | 10/1940 | Kliesrath | 192/3.63 |
| 2,221,199 | 11/1940 | Peo et al. | 192/3.63 |
| 2,226,205 | 12/1940 | Linsley | 192/3.63 |
| 3,273,679 | 9/1966 | Uher | 192/0.052 |
| 3,459,285 | 8/1969 | Lamburn et al. | 192/3.57 |
| 3,548,981 | 12/1970 | Hill et al. | 192/3.57 |
| 4,068,682 | 1/1978 | O'Neil | 137/596.18 |
| 4,274,521 | 6/1981 | Cadeddu | 192/3.63 |

*Primary Examiner*—George H. Krizmanich
*Attorney, Agent, or Firm*—Karl F. Ross

[57] ABSTRACT

A transmission shiftable to change transmission ratios by the operation of a member whose effectiveness depends upon a pressure fluid, e.g. through a valve communicating the fluid to actuators of the gear-change system, has a clutch connecting the output shaft of a prime mover as an internal-combustion engine with the input shaft of the transmission. According to the invention, the clutch-operating cylinder is connected by an entraining device with a valve controlling the pressure fluid. A lost motion may be provided between the operating member of the cylinder and the valve seats to ensure full opening of the clutch before operation of the transmission is enabled.

5 Claims, 2 Drawing Figures

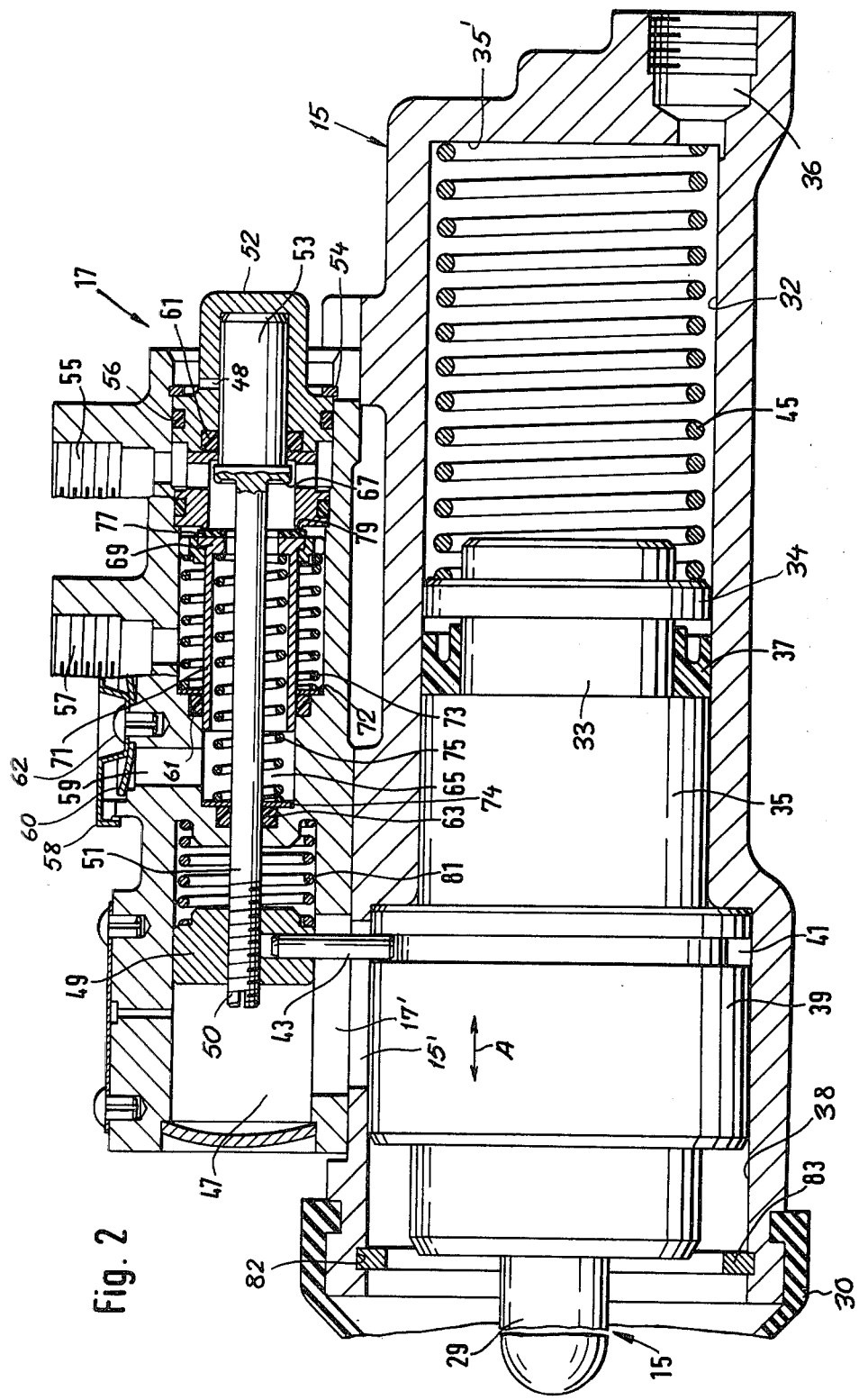

TRANSMISSION-CLUTCH OPERATING SYSTEM

FIELD OF THE INVENTION

Our present invention relates to a transmission and clutch-operating system in which actuation of the clutch coupling the transmission to a prime mover such as an internal-combustion engine must be effected before the transmission itself is operated for gear or speed change.

BACKGROUND OF THE INVENTION

In automotive vehicles and other systems in which a drive such as a prime mover, e.g. an internal-combustion engine, is coupled to a load, e.g. the driven wheels of the vehicle, through a gear-change or speed change transmission, it is common to provide a clutch between the output shaft (crankshaft) of the prime mover and the input shaft of the transmission.

The transmission can be of a fluid-dependent or fluid operated type in which the member, e.g. a rod, link or lever controlling the speed ratio between the input and output shafts of the transmission, is ineffective in the absence of a fluid pressure supplied to the transmission. This control member can operate, for example, a valve which controls the flow of compressed air to actuators of clutches or the like within the transmission to effect gear change, speed change or ratio change.

It is a common practice in such systems as well to provide a clutch pedal which is operated by the driver of the vehicle and which is effective through a clutch-operating cylinder to actuate the clutch and decouple the output shaft of the invention from the input shaft of the transmission.

The transmission can be directly or indirectly actuated by the compressed air. A direct actuation is effected when the transmission-control member operates a valve in the manner described. An indirect actuation may use the compressed air to block movement of the control member which can be mechanically connected to the shifting mechanism in the transmission.

In automotive vehicles and especially construction equipment, yard vehicles, earth-moving equipment and the like in which the transmission is generally heavily loaded, it is essential to prevent shifting of the transmission while the clutch is engaged. Thus devices and mechanisms have been provided heretofore to prevent shifting of the transmission while the clutch is engaged, such devices being connected with the clutch-actuating rod. One problem with such devices is that, even upon operation of the clutch pedal by the driver of the vehicle, complete decoupling cannot be guaranteed before the gear change is initiated in the transmission.

OBJECTS OF THE INVENTION

It is the principal object of the present invention to provide a shifting system for a pressurized fluid responsive transmission which ensures that decoupling of the clutch is complete prior to the inception of a gear-change operation.

Another object of the invention is to provide a system for the purpose described is reliable and which cannot be disabled or undesirably modified in function during its operation or life.

SUMMARY OF THE INVENTION

These objects and others which will become apparent hereinafter are attained, in accordance with the present invention, in an improvement over the earlier system utilizing a fluid-pressure-responsive transmission and a clutch connecting this transmission with the engine, which provides a clutch-operating cylinder whose effective member, i.e. piston, is coupled by an entraining device or means, preferably with lost motion, to a valve which supplies the pressurized fluid to the transmission. This valve may be referred to hereinafter as a supply valve and has its valve member directly coupled to the piston of the clutch-operating cylinder in accordance with the invention.

The supply valve, which can be a three-port, two-position (3/2 distribution) valve, is advantageously mounted upon or formed directly on the clutch-operating cylinder so that its axis is parallel to the cylinder axis. Thus, after installation of the assembly, the supply valve cannot be tampered with.

Advantageously, the piston of the clutch-operating cylinder is biased by a spring and a spring of the supply valve is effective in the same direction so that the spring forces support the actuation forces which are applied to the device.

The actuation of the clutch and blocking and unblocking of the operation of the transmission thus are determined precisely and at the time of construction, by the relationship of the piston to the valve member and the seats of the latter. The timing of clutch decoupling or coupling and valve opening and closing is thus fully predetermined without any danger that subsequent adjustment can alter the relationship. This has been found to be particularly important when the transmission is used for yard vehicles as well as for commercial or long distance vehicles.

The valve construction is such that the entrainment force which must be developed by the clutch-operating cylinder is minimal so that the response speed of the valve is high and the opening and closing of the fluid-pressure conduit is effected rapidly and sharply. The entraining means can be a laterally extending pin engaging the piston and the valve member and is not unduly stressed because of the low actuation forces involved.

The supply valve of the instant invention has been found to be effective for various kinds of transmissions whether of the fluid-blocking or fluid-operated types and can use compressed air or other pneumatic-type systems as well as hydraulic systems. When hydraulic systems are used, the pressurized fluid need not only actuate mechanical members but may provide fluid coupling between two members. In all cases, the valve is designed to interrupt the fluid supply conduit as long as the clutch remains engaged.

BRIEF DESCRIPTION OF THE DRAWING

The above and other objects, features and advantages of the present invention, will become more readily apparent from the following description, reference being made to the accompanying drawing, in which:

FIG. 2 is an axial cross section through a clutch-operating cylinder and supply valve according to the invention.

SPECIFIC DESCRIPTION

Figure 1:
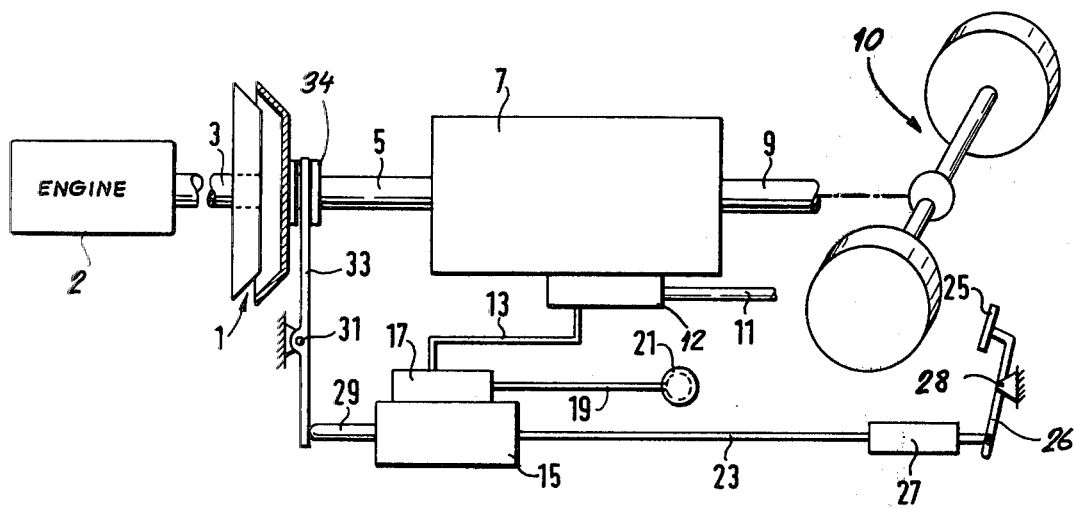
FIG. 1 is a diagram illustrating the basic elements of a transmission system according to the invention in an elevational view.

FIG. 1 of the drawing shows a system, in accordance with the present invention, in which a clutch 1 is provided between a motor-driven shaft 3 and the input shaft 4 of a gear-change transmission 7. In general, the shaft 3 may be the crank shaft of an engine while the output shaft 9 may be coupled to the load which can be the vehicle wheels as represented at 10. While the invention is particularly applicable to motor vehicles, it also may be used for the control or operation of various industrial machines and indeed any industrial or vehicle installation in which a transmission 7 and a clutch 1 is provided between the prime mover 2 and the load 10.

The gear-change transmission 7 can be a conventional stepped transmission having sets of gears or planetaries establishing various transmission ratios between the input shaft 5 and the output shaft 9 as selected by a shifting rod 11 which is only effective when the fluid pressure line 13 i.e. the fluid input allowing transmission operation is pressurized. To this end, the rod 11 can operate upon a valve 12 to selectively admit the pressure fluid to clutches or brakes within the transmission 7 for selection of the particular gear ratio or, in place of the valve 12, means can be provided which blocks the movement of the rod 11 until line 13 is pressurized.

The pressurizable medium can be either a liquid in the case of hydraulically operated transmissions, or a gas such as compressed air. In the embodiment shown compressed air is the pressure medium.

The control unit of the present invention is formed as a single structure with a clutch-operating cylinder 15 and a supply valve 17. The supply valve 17 is connected via line 19 with a fluid pressure source represented as a compressed-air line 21 and line 13 opens into this valve 17 as well.

A hydraulic line 23 communicates with the cylinder 15 and is connected to a master or transmitting cylinder 27 whose piston is engaged by a lever 26 fulcrumed at 28 and carrying the clutch pedal 25. Thus, when the pedal 25 is depressed, the hydraulic medium in cylinder 27 is pressurized and displaced, this fluid pressurizing the cylinder 15.

At the left-hand end of cylinder 15, a piston rod 29 is shown and bears upon one end of a lever 33 fulcrumed at 31 and bifurcated to engage the collar 34 connected to the axially movable clutch member for opening and closing the clutch. Upon displacement of the lever 33 in the clockwise sense, therefore, the clutch is disengaged to decouple the shaft 3 from shaft 5 while rotation of the lever 33 in the counterclockwise sense engages the clutch to couple the two shafts together.

In FIG. 2 we have shown the clutch-operating cylinder/supply valve unit 15/17 in greater detail.

Thus the piston rod 29, within the cylinder 15, is formed with a piston 39 which is a large-diameter step prevented from passing out of the cylinder by a split ring 83 lodged in a groove 82 at the left-hand end of a chamber 38 of correspondingly large diameter receiving this piston. A dust sleeve 30 surrounds this end of the cylinder and hugs the rod 29 to prevent contamination of the cylinder.

The large-diameter step of the piston directly adjoins a smaller diameter piston step 35 terminating in a boss 33 around which a gland-type seal 37 is provided, the boss having outwardly extending flanges 34 against which a compression-type coil spring 45 bears. The opposite end of the coil spring, which is received in the pressurizable compartment 32 of cylinder 15, is seated against the right-hand end 35' of the cylinder.

The right-hand end of the cylinder 15 is also formed with a port 36 connecting the cylinder to line 23 previously mentioned so that pressurization of the chamber 32 upon actuation of the clutch pedal will drive the pistons 35, 39 to the left in the direction in which the spring 45 is effective.

The large-diameter portion 39 of the piston is an adjustment ring shiftable along the small-diameter step 35 in a conventional way to adjust the relative positions of the rod 29 of the rear of piston step 35 for wear of the clutch.

Member 39 is formed with a circumferential groove 41 engaged by a transverse (radial) pin 43. The pin 43 is shiftable in the direction of arrow A in a pair of registering longitudinal slots 15', 17' in the cylinder and valve housing portions, respectively.

The left-hand end of the supply valve 17 is formed with a chamber 47 into which the pin 43 projects to engage a slide 49 screwed onto a threaded end 50 of a rod 51 and can be locked relative to the latter by any conventional means, such as a counternut or a setscrew known per se.

The opposite end of the rod 51 is formed with a cylindrical extension 53 guided in a housing portion 52 of the valve which is vented at 48 and is held in place by a split ring 54 and is provided with a seal 56.

The valve housing is also formed with a fitting or port 55 connected to the line 13, a fitting or port 57 connected to the line 19 and a further fitting or port 59 which serves as a vent.

The port 59 thus is in communication with the atmosphere through a check valve 60 and a spray-excluding cap 58 held in place by a pin 62.

The rod 51, sealed by rings 61 and 63, extends through a chamber 65 and is formed at the left-hand end of the guide projection 53 with an outlet seat 67 which can engage and close upon a valve plate 69 concentrically surrounding the rod 51 with clearance and formed at the end of a sleeve 71.

An outer spring 73 is seated against an outer flange of member 69 and a shoulder 72 formed on the housing of the valve 17. An inner spring 75, effective in the same direction, rests against a seat 74 of the housing and bears along an inwardly extending flange of the valve plate 69 so that movement of the rod 51 to the left acts against the forces of the springs 73 and 75. The spring 73 bears against a shoulder of an enlargement of the chamber 65 while spring 75 bottoms against the left-hand end of this chamber.

The right-hand end face of the valve plate 69 is formed with a rubber sealing disk 77 which, in the position shown in FIG. 2, rests against an inlet seat 79. Thus with the position of the valve shown in FIG. 2, a connection between the ports 55 and 57 is blocked while the port 55 is vented through the port 59.

At the left-hand end of the rod 51, a spring 81, seated against a wall of chamber 47, bears upon the slide 49 in a direction opposite the forces supplying direction of springs 73 and 75 and in the same direction as spring 45. If the spring 81 applies a force of 3 kp, the combined force of springs 73 and 75 can be about 7 kp so that the springs 73 and 75 establish the high position or rest position of the valve in which line 13 is vented.

Since line 13 is vented, operation of the transmission 7 by actuation of rod 11 is precluded. When the clutch 1 is engaged there is torque transmission between shafts 3 and 9.

When the clutch pedal is actuated, cylinder 15 is pressurized via line 23 to drive the piston step 35 to the left and swing the lever 33 to open the clutch 1 after a partial stroke, corresponding to the decoupling distance.

During this movement to the left of the pin 43, the slide 49 is entrained until, once the decoupling of the clutch has occurred, the seat 67 engages the seal 77 to block communication between ports 55 and 59. Thus the outlet seat is closed.

Simultaneously, the rod 51 lifts the seal 77 away from seat 79 to open the outlet seat against the force of springs 73 and 75 but in the direction of the force of spring 81 which reduces the actuating force required for the valve. This is important since it precludes unnecessary force upon the slide coupling between ring 49 and piston step 39.

Communication between ports 55 and 57 is thus opened, line 13 is pressurized and the clutch, having been fully opened, operation of the transmission is possible. The high pressure from port 57, upon the initial opening of the seat 79, assists in driving the sleeve 71 to the left and likewise precludes immobilizing the valve plate 69.

Naturally, once gear change is complete, release of the pedal will depressurize chamber 32 and allow the clutch lever to swing in the counterclockwise sense to close the clutch, returning the piston 35 to the right and thereby ultimately blocking the port 57 while venting port 55 to the atmosphere. The line 13 is depressurized and the transmission cannot be shifted again until the clutch is operated.

As noted previously, the sleeve-shaft adjustment ring 39 functions as a one-way slide clutch in the piston 35 so that the rod 29 always remains without play against the lever 33. The ring can cooperate with the abutment 83 to ensure the necessary adjustment and it should be noted that other conventional means may be used for the same purpose.

We claim:

1. A transmission system comprising:
  a driven shaft connected to a motor;
  a transmission having an input and an output shaft, the output shaft being connectable to a load, said transmission being shiftable to vary the transmission ratio between said input and output shafts in dependence upon application of fluid pressure to a fluid input;
  a clutch between said driven shaft and said input shaft;
  a clutch-operating cylinder having a piston operatively connected to said clutch for opening same upon displacement of said piston; and
  a supply valve connecting a source of fluid under pressure with said input and including a valve member entrained by said piston for controlling the pressurization at said input with said fluid to permit ratio shifting of said transmission only upon opening of said clutch, said supply valve having a first port connected to said input, a second port connected to said source and a third port for relieving fluid pressure, said valve member being shiftable in a valve housing and including:
  a slide coupled with said piston;
  a valve plate blocking communication between said first and second ports in a rest position;
  first spring means biasing said valve plate into said rest position, said valve plate being engaged by said valve member to unblock communication between said first and said second ports and block communication between said first and third ports; and
  a transverse pin connecting said piston and said slide.

2. The system defined in claim 1 wherein said valve member is a rod provided with said slide at one end and with a formation engageable with said valve plate, said valve plate being formed on a sleeve surrounding said rod.

3. The system defined in claim 2, further comprising second spring means bearing upon said slide with a force applying direction opposite that of said first spring means.

4. The system defined in claim 1, claim 2 or claim 4 wherein said piston is formed with an adjustment member for compensating for wear of said clutch, said pin engaging said compensating member.

5. The system defined in claim 4 wherein said cylinder and the housing of said valve have parallel axes, said pin extending perpendicular to said axes, said housing being formed directly on said cylinder.

* * * * *